(No Model.)

R. W. O. REHMENKLAU.
MEANS FOR CLOSING TIRE PUNCTURES.

No. 593,529. Patented Nov. 9, 1897.

Witnesses
C. F. Kilgore
F. D. Merchant

Inventor
Rudolph W. O. Rehmenklau
By his Attorney
Jas. F. Williamson

UNITED STATES PATENT OFFICE.

RUDOLPH W. O. REHMENKLAU, OF MINNEAPOLIS, MINNESOTA.

MEANS FOR CLOSING TIRE-PUNCTURES.

SPECIFICATION forming part of Letters Patent No. 593,529, dated November 9, 1897.

Application filed March 10, 1896. Serial No. 582,587. (No model.)

*To all whom it may concern:*

Be it known that I, RUDOLPH W. O. REHMENKLAU, a citizen of the United States, residing at Minneapolis, in the county of Hennepin and State of Minnesota, have invented certain new and useful Improvements in Means for Closing Tire-Punctures; and I do hereby declare the following to be a full, clear, and exact description of the invention, such as will enable others skilled in the art to which it appertains to make and use the same.

My invention relates particularly to pneumatic tires such as used on bicycles, and has for its especial object to provide an improvement in the same whereby punctures in the tire will be automatically closed or stopped up.

To this end my invention consists of the novel provision hereinafter described, and defined in the claims.

The preferred form of my invention is illustrated in the accompanying drawings, wherein like letters refer to like parts throughout both views.

Figure 1:
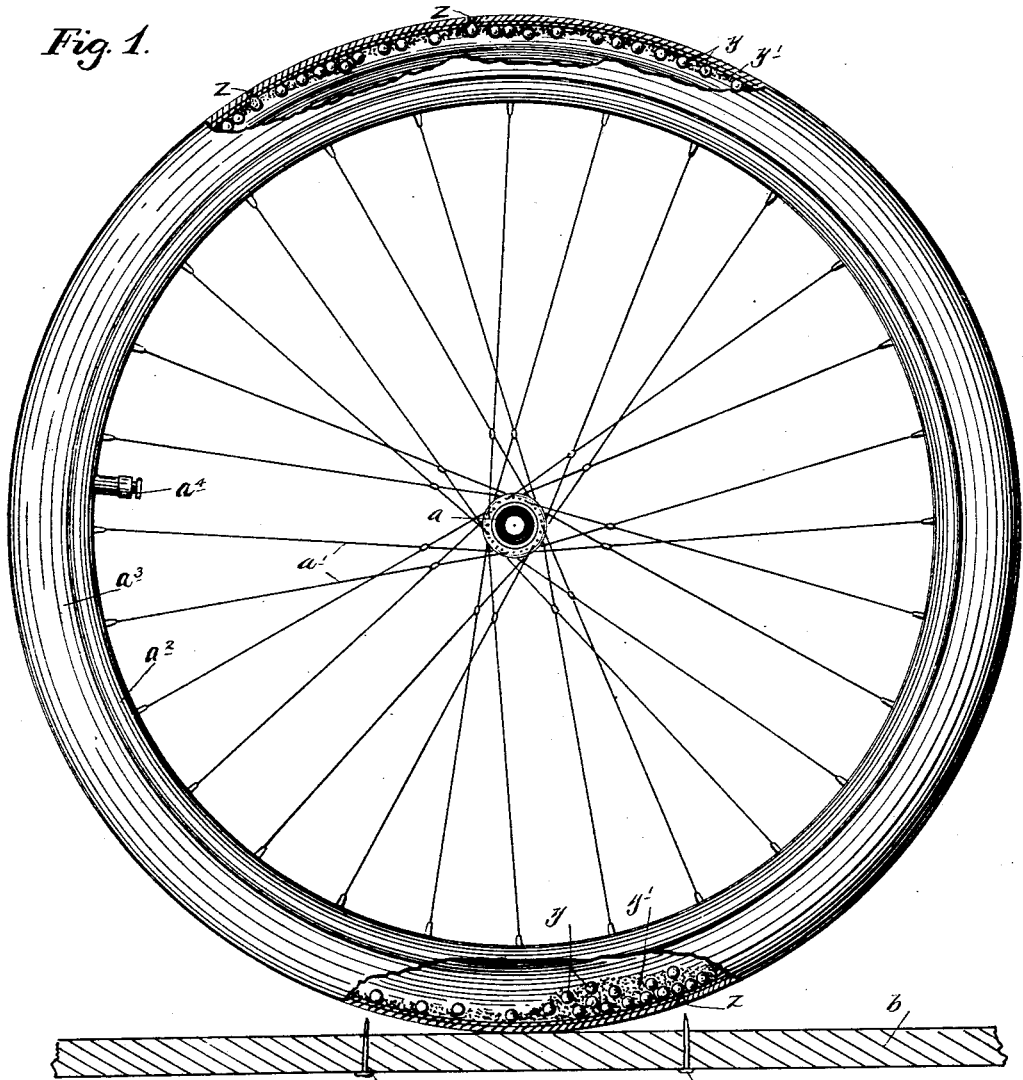
Figure 2:
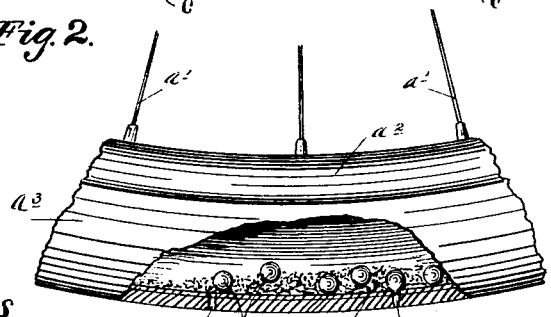

Figure 1 is a view in side elevation, showing a pneumatic wheel equipped with my invention, some parts of said wheel being broken away and showing also the section of a walk or roadway over which the wheel may be assumed to be traveling; and Fig. 2 is an enlarged view, partly in side elevation and partly in section, with some parts broken away, showing a portion of the wheel and pneumatic tire.

$a$ indicates the hub, $a'$ the spokes, $a^2$ the felly, $a^3$ the pneumatic tire, and $a^4$ the air-valve, of an ordinary pneumatic wheel such as used on the present standard types of bicycles.

$b$ indicates a walk or roadway, and $c$ indicates tacks or brads projecting up through said road-bed $b$.

$z$ indicates punctures in the tire $a^3$, such as might be made by the brads $c$.

Broadly stated, my invention consists in placing in the interior of the pneumatic tire $a^3$ or any other vessel with an elastic fluid under pressure a multiplicity of loose particles, which are adapted to close punctures in said tire or other vessel under the action of the fluid-pressure therein contained. For this purpose I use a mixture of small particles of various sizes made of cork, leather shavings, dry ground paper-pulp, rubber scraps, or any other suitable material which is of such a nature that it is adapted to be seated or pressed into or against the puncture by the action of the air-pressure in the tire or other vessel to close or stop up said puncture. In my preferred arrangement, however, I employ particles of the above-noted general character, certain of which are spherical in form and about the size of small marbles, and other particles, which may be irregular in form and size, but very small as compared with said spherical bodies. This is the nature of the material with which the tire in the accompanying drawings is shown as partially filled. Of these particles $y$ indicates the spherical bodies, while $y'$ indicates the regular and fine particles.

The action will be substantially as follows: As the wheel is revolved on its forward progress certain of the particles $y$ and $y'$ will, under the action of centrifugal force, be spread out in a thin layer and caused to hug the outer or large circle of the interior of the tire. However, as the action of centrifugal force rapidly decreases on that portion of the wheel which is approaching the ground, the particles on the advance side of the wheel, being relieved from the action of centrifugal force, will by the action of gravity be hastened toward the ground with an accelerated action. From this action it follows that the thickest layer of the particles will always be nearest to the ground. Obviously this is a desired action, for a puncture will almost invariably be given to that portion of the wheel which rests on the ground, and it is of course desirable that the particles should be immediately at hand, so that the puncture will be instantly stopped and any material escape of air thereby prevented.

It is important to note the exact manner in which the particles $y$ and $y'$ collect at the bottom of the tire when relieved by the action of centrifugal force and accelerated in their downward movement by the action of gravity. Suppose a puncture to have taken place in that portion of the tire which rests upon the ground. The spheres $y$ will of course have less rolling resistance than the fine irregular portions $y'$, and hence will roll ahead of said irregular portions and will reach the puncture first, where, by the action of the escaping air, one of said spheres $y$ will be forced against and into said puncture and there held by the pressure of air in the tire. A single sphere being thus located and forced against a puncture will tightly plug and close the same unless the puncture be of very irregular or ragged shape, in which case the finer particles which come sliding after the spheres will be forced into the leaks or unclosed portions of the puncture left open by the sphere, thus completely closing said puncture by assisting or reinforcing the action of the spheres. Thus by the combined action of the particles $y$ and $y'$ all punctures may be closed regardless of form or shape.

The particles $y$ and $y'$ being preferably of very light material—such, for example, as cork—when once forced against or seated into the puncture will be there held by the air-pressure in the tire with such force that they will not be knocked out of place by the contact therewith of the loose particles in the tire. Again, these particles are so light that they will not affect the balance of the wheel to any material degree.

In virtue of the fact that the large particles $y$ are spherical in form they will locate themselves over the center of the puncture, and being soft and flexible they will adjust themselves and plug up a much larger hole than if they were of harder material. The above particles being once positioned over a puncture, they will have a plug-valve action and will be held in place as long as there is pressure in the tire.

In equipping new tires with my above invention the mixture of particles or repairing material would of course be placed in the air-chamber of the tire when in the process of construction. In applying the mixture to old tires the air-valve of the wheel may be temporarily removed to permit the introduction of the same into the chamber of the tire.

The above puncture closing or plugging action, it will be noted, is completely automatic and can take place without requiring the rider to dismount. Indeed, it will probably take place without the rider's attention being called to the fact that the tire has been punctured.

Obviously the above device affords a very simple, cheap, convenient, and efficient device for stopping or closing the punctures in pneumatic tires.

It will also be understood that so far as the broad principle of my invention is concerned it is well adapted as means for closing punctures in all forms of vessels which contain elastic fluids under pressure.

What I claim, and desire to secure by Letters Patent of the United States, is as follows:

1. A pneumatic tire containing a multiplicity of loose spherical particles of light material, adapted to automatically close punctures in said tire, under the action of the fluid-pressure therein, substantially as described.

2. A pneumatic tire, containing a multiplicity of loose particles, certain of which are relatively large and others of which are relatively small, as compared with each other, said particles being adapted to automatically close punctures in said tire, under the action of the fluid-pressure therein, substantially as described.

3. A pneumatic tire, containing a multiplicity of loose particles, certain of which are relatively large and spherical in form, and others of which are relatively small and of irregular form, said particles being adapted to automatically close punctures in said tire, under the action of the fluid-pressure therein, substantially as described.

In testimony whereof I affix my signature in presence of two witnesses.

RUDOLPH W. O. REHMENKLAU.

Witnesses:
JAS. F. WILLIAMSON,
F. D. MERCHANT.